US010773182B2

(12) United States Patent
Ling et al.

(10) Patent No.: US 10,773,182 B2
(45) Date of Patent: Sep. 15, 2020

(54) MULTI-STAGE EVAPORATION SYSTEM ENHANCED BY A GRAVITY-REDUCED FIELD

(71) Applicant: NANJING TECH UNIVERSITY, Nanjing (CN)

(72) Inventors: Xiang Ling, Nanjing (CN); Weihong Liu, Nanjing (CN); Yang Li, Nanjing (CN); Xin Huang, Nanjing (CN); Tingfen Ke, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 0 days.

(21) Appl. No.: 16/474,557

(22) PCT Filed: Jan. 11, 2018

(86) PCT No.: PCT/CN2018/072185
§ 371 (c)(1),
(2) Date: Jun. 28, 2019

(87) PCT Pub. No.: WO2018/133724
PCT Pub. Date: Jul. 26, 2018

(65) Prior Publication Data
US 2019/0336881 A1     Nov. 7, 2019

(30) Foreign Application Priority Data

Jan. 17, 2017 (CN) .......................... 2017 1 0029809

(51) Int. Cl.
*B01D 1/26*     (2006.01)
*B01D 1/22*     (2006.01)
*B01D 1/20*     (2006.01)

(52) U.S. Cl.
CPC ................. *B01D 1/26* (2013.01); *B01D 1/20* (2013.01); *B01D 1/222* (2013.01)

(58) Field of Classification Search
CPC .......... B01D 1/0082; B01D 1/14; B01D 1/16; B01D 1/20; B01D 1/222; B01D 1/26;
(Continued)

(56) References Cited

U.S. PATENT DOCUMENTS 3,654,092 A * 4/1972 St. Clair .................. B01D 1/26
                                                        202/174
3,783,108 A * 1/1974 Huhta Koivisto ....... B01D 1/04
                                                         203/11
(Continued)

FOREIGN PATENT DOCUMENTS

| CN | 1205984 A | 1/1999 |
|---|---|---|
| CN | 101831348 A | 9/2010 |

(Continued)

OTHER PUBLICATIONS

CN104689584A_ENG (Espacenet machine translation of Xiang) (Year: 2015).*
(Continued)

*Primary Examiner* — Jonathan Miller
*Assistant Examiner* — Gabriel E Gitman
(74) *Attorney, Agent, or Firm* — Bayramoglu Law Offices LLC

(57) ABSTRACT

A multi-stage evaporation system enhanced by a gravity-reduced field consists of evaporation structures of multiple stages. There are three different operation modes, namely, a serial-connected air and parallel-connected solution mode, a serial-connected air and serial-connected solution mode, and a parallel-connected air and serial-connected solution mode. In the evaporation chambers, the solution directly contacts the air to transfer the heat and mass. The solution is sprayed on the rotating filling material, and is uniformly distributed under the action of the gravity-reduced field, which enhances the heat and mass transfer. The solution is gasified (Continued)

by absorbing the heat energy thereof. Meanwhile, the air can carry more water vapor after being heated by the solution and thus having an increased temperature, and take away the gasified solution, thereby achieving the purpose of evaporation.

7 Claims, 4 Drawing Sheets

(58) Field of Classification Search
CPC .......... B01D 3/007; B01D 3/08; B01D 3/146; B01D 3/346; B01D 3/42; B01D 5/006
See application file for complete search history.

(56) References Cited

U.S. PATENT DOCUMENTS

| | | | | |
|---|---|---|---|---|
| 4,282,832 | A * | 8/1981 | Szydlowski | B01D 3/16 122/28 |
| 5,601,688 | A * | 2/1997 | Assaf | B01D 1/16 159/44 |
| 6,684,648 | B2 * | 2/2004 | Faqih | B01D 5/009 62/93 |
| 6,695,951 | B1 * | 2/2004 | Bitterly | B01D 1/222 202/182 |
| 2006/0157338 | A1 * | 7/2006 | Eddington | B01D 1/26 203/21 |
| 2007/0045100 | A1 | 3/2007 | Wright | |
| 2015/0047963 | A1 * | 2/2015 | Roch | B01D 3/007 202/185.1 |

FOREIGN PATENT DOCUMENTS

| | | | | |
|---|---|---|---|---|
| CN | 203170033 U | | 9/2013 | |
| CN | 104118918 A | | 10/2014 | |
| CN | 104567462 A | | 4/2015 | |
| CN | 205709996 U | * | 4/2015 | ............... F28C 3/06 |
| CN | 104689584 A | * | 6/2015 | |
| CN | 104689584 A | | 6/2015 | |
| CN | 104707350 A | | 6/2015 | |
| CN | 105536276 A | | 5/2016 | |
| CN | 205709996 U | * | 11/2016 | ........... Y02A 20/131 |
| CN | 107042022 A | | 8/2017 | |

OTHER PUBLICATIONS

CN205709996U_ENG (Espacenet machine translation of Guanglin) (Year: 2016).*
CN205709996U_ENG (Espacenet machine translation of Wei) (Year: 2015).*
CN104689584A_ENG (Espacenet machine translation of Ling Xiang) (Year: 2015).*

* cited by examiner

MULTI-STAGE EVAPORATION SYSTEM ENHANCED BY A GRAVITY-REDUCED FIELD

CROSS REFERENCE TO THE RELATED APPLICATIONS

This application is the national phase entry of International Application No. PCT/CN2018/072185, filed on Jan. 11, 2018, which is based upon and claims priority to Chinese Patent Application No. 201710029809.0, filed on Jan. 17, 2017, the entire contents of which are incorporated herein by reference.

TECHNICAL FIELD

The present invention belongs to the field of evaporating processing, and in particular relates to a multi-stage evaporation system enhanced by a gravity-reduced field.

BACKGROUND

The evaporation process is a common and primary process in industrial processes such as chemical industry, light industry, food manufacturing, pharmacy, and effluent treatment etc. The evaporation process consumes a great amount of steam, and is a high energy-consuming process. Since the evaporation process is far and wide applied in the process industry, the improvement of the energy utilization rate in the evaporation process plays a significant role in saving the energy, increasing the efficiency, and enhancing industrial competitiveness in the process industries such as petrochemicals and metallurgy etc.

At present, the technique for concentrating the solution by the evaporation method mainly includes multiple-effect evaporation technique and the mechanical vapor recompression technique. In the multiple-effect evaporation technique, the secondary steam produced by the earlier stage of evaporator is used as the heat source to heat the later stage of evaporator, and a plurality of evaporators are connected in series for operation, thus greatly reducing the steam use level. In the mechanical vapor recompression technique, the secondary steam produced by the evaporator is recompressed to improve the thermodynamic quality thereof, and reenters into the evaporator as heating steam to supplement or even completely replace the primary steam.

The multiple-effect evaporation technique can save a part of the primary steam, but the continuous steam supply is required for the first effect, and the secondary steam generated by the final effect is generally directly condensed and not utilized. Moreover, the more effects, the larger the equipment is, which increases the investment in the equipment. The mechanical steam recompression technique overcomes the waste caused by directly condensing and discharging the residual secondary steam of the final effect in the multiple-effect evaporation technique. The operating cost mainly includes the power consumption of steam compressor. However, the anti-rust and anti-corrosion protection of the key equipment, i.e. the steam compressor, and the safety and reliability under long-term operating conditions are tough problems to be solved.

SUMMARY

For the deficiencies in the prior art, the present invention provides a multi-stage evaporation system enhanced by a gravity-reduced field, which utilizes the moisture-carrying capacity of the air to take away the pure water in the solution, so as to achieve the evaporation purpose. The principle of evaporating is to use the characteristic that the moisture-carrying capacity of the air increases with the increase of temperature. The heated solution directly contacts the air to perform the heat transfer and mass transfer. The air after heating and absorbing moisture enters the regenerator and exchanges the heat with the solution, so as to make a reasonable use of energy. With the multi-stage evaporation structure, the air volume and the energy consumption of the fan are reduced. With the low-speed rotation of the filling material, a gravity-reduced field is formed. The solution is uniformly distributed in the filling material, thereby enhancing the heat and mass transfer efficiency. The solution tends to move to the periphery along the radial direction in the filling material to avoid scale formation.

To achieve the above-mentioned objective, the present invention includes the following technical solutions.

A multi-stage evaporation system enhanced by a gravity-reduced field, characterized in that it includes a liquid storage tank, a preheater, a primary evaporation structure, a secondary evaporation structure, a tertiary evaporation structure, a fan, a feeding pump, a circulation pump, and a circulating liquid tank. The primary evaporation structure, the secondary evaporation structure, and the tertiary evaporation structure each include an evaporation chamber, a condensing regenerator, and a condensing dehumidifier. A raw material solution in the liquid storage tank and a concentrated solution in the circulating liquid tank are mixed under an action of the feeding pump and the circulation pump respectively to form a mixed liquid. The mixed liquid is equally divided into three groups, and the three groups of mixed liquid respectively enter the condensing regenerators of the evaporation structures of different stages. After absorbing the waste heat of moisture air, the mixed liquid flows together to enter the preheater. After being heated by steam, the mixed liquid is equally divided into three groups again, and the three groups of mixed liquid respectively enters the evaporation chambers of the evaporation structures of different stages. The mixed liquid directly contacts circulating air in the evaporation chamber to transfer heat and mass and flows into the circulating liquid tank from the bottom of the evaporation chamber. The circulating air sequentially passes through the primary evaporation structure, the secondary evaporation structure, and the tertiary evaporation structure under an action of the fan and circulates, continuously.

A multi-stage evaporation system enhanced by a gravity-reduced field, characterized in that it includes: a liquid storage tank, a feeding pump, a circulation pump, a primary evaporation structure, a secondary evaporation structure, a tertiary evaporation structure, a fan, and a circulating liquid tank. The primary evaporation structure, the secondary evaporation structure, and the tertiary evaporation structure each include an evaporation chamber, a condensing regenerator, a condensing dehumidifier, and a preheater. A raw material solution in the liquid storage tank and a concentrated solution in the circulating liquid tank are mixed under an action of the feeding pump and the circulation pump respectively to form a mixed liquid. The mixed liquid sequentially enters the tertiary evaporation structure, the secondary evaporation structure, and the primary evaporation structure. After being heated by the condensing regenerator and the preheater in the evaporation structures of different stages, the mixed liquid enters the evaporation chamber. The mixed liquid directly contacts circulating air in the evaporation chamber to transfer heat and mass, and flows into the circulating liquid tank from a bottom of the evaporation chamber. The circulating air sequentially passes through the primary evaporation structure, the secondary evaporation structure, and the tertiary evaporation structure under an action of the fan, circulates, continuously.

A multi-stage evaporation system enhanced by a gravity-reduced field, characterized in that it includes: a liquid storage tank, a feeding pump, a circulation pump, a primary evaporation structure, a secondary evaporation structure, a tertiary evaporation structure, a dust collector, a fan, and a circulating liquid tank. The primary evaporation structure, the secondary evaporation structure, and the tertiary evaporation structure each include an evaporation chamber, a condensing regenerator, and a preheater. A raw material solution in the liquid storage tank and a concentrated solution in the circulating liquid tank are mixed under an action of the feeding pump and the circulation pump respectively to form a mixed liquid. The mixed liquid sequentially enters the tertiary evaporation structure, the secondary evaporation structure, and the primary evaporation structure. After being heated by the condensing regenerator and preheater in the evaporation structures of different stages, the mixed liquid enters the evaporation chamber. The mixed liquid directly contacts air in the evaporation chamber to transfer heat and mass, and flows into the circulating liquid tank from the bottom of the evaporation chamber. The air respectively enters the primary evaporation structure, the secondary evaporation structure, and the tertiary evaporation structure under an action of the dust collector and the fan, and is eventually vented.

In order to optimize the above-mentioned technical solutions, the present invention also provides the following specific implementations.

Flow rates of the mixed liquid entering the condensing regenerators of the evaporation structures of different stages are controlled to be equal by a valve. When the mixed liquid flows through the preheater, the mixed liquid is equally divided into three groups by controlling a valve to enter the evaporating chambers of the evaporation structures in different stages.

The fan blows the circulating air into the evaporation chamber from the bottom of the evaporation chamber. The circulating air heated by the mixed liquid takes away moisture in the mixed liquid, and exchanges heat with the mixed liquid in the condensing regenerator to recycle the waste heat from the circulating air. Then, the circulating air passes through the condensing dehumidifier to exchange heat with cooling water, so as to make the circulating air return to a dehumidified state before entering the evaporation chamber. Then, the circulating air enters an evaporation structure of the next stage to perform a closed circulation.

The condensing dehumidifier cools the circulating air by circulating cooling water. After absorbing the heat of the circulating air, the circulating cooling water is cooled through the cool water tower. Then, the circulating cooling water is pumped into the condensing dehumidifier by the circulation pump again to perform a circulating operation.

A solution inlet pipe is provided on an upper portion of the evaporation chamber. The solution inlet pipe is connected to the preheater for an inflow of the mixed liquid. A solution outlet pipe is provided on the bottom portion of the evaporation chamber. The solution outlet pipe is connected to the circulating liquid tank for an outflow of the concentrated solution. An air inlet pipe is further provided on the lower portion of the evaporation chamber. The air inlet pipe is connected to the fan for an inflow of the circulating air. An air outlet pipe is further provided on the top portion of the evaporation chamber. The air outlet pipe is connected to the condensing regenerator for an outflow of the circulating air to recycle the waste heat from circulating air.

A solution inlet pipe is provided on an upper portion of the evaporation chamber. The solution inlet pipe is connected to the preheater for an inflow of the mixed liquid. A solution outlet pipe is provided on the bottom portion of the evaporation chamber. The solution outlet pipe is connected to the circulating liquid tank for an outflow of the concentrated solution. An air inlet pipe is further provided on the lower part of the evaporation chamber. The air inlet pipe is connected to the fan and the dust collector for an inflow of the air. An air outlet pipe is further provided on the top portion of the evaporation chamber. The air outlet pipe is connected to the condensing regenerator. The air is vented from the condensing regenerator.

The evaporation chamber has a spraying structure. A plurality of spraying nozzles are provided at a roof of the evaporation chamber. The mixed liquid sprayed by each spraying nozzle falls conically and angularly. The solution inlet pipe extends into the evaporation chamber and forms a circular support on the roof of the evaporation chamber. The spraying nozzles are uniformly arranged on the circular support.

The evaporation chamber has a gravity-reduced field rotating structure. A cylindrical filling material layer is fixed on a rotating shaft. A heated solution is sprayed onto a filling material through the spraying nozzles on the roof of the evaporation chamber. The motor drives the rotating shaft to rotate by a belt. The filling material is driven by the rotating shaft to rotate at a low speed, so as to form a gravity-reduced field. The solution is uniformly distributed in the filling material, and tends to move along the radial direction from the middle to the periphery of the filling material.

The advantages of the present invention include: according to the differences in the processing amount, concentration, and processing requirements of the solution, and the differences in operating environment, evaporation systems with different serial or parallel connections may be selected. When the initial concentration of the solution to be processed is low, while the processing requirements for the concentration is high, it is required to perform multiple circulating operation to meet the specific processing requirements. In this case, the serial-connected solution mode is preferred, in which the solution is gradually concentrated to meet the specific processing requirements by serially connecting the multi-stage evaporation chambers for operation. When the amount of the solution to be processed is large, the parallel-connected solution mode is preferred to improve the processing efficiency, in which the solution processing amount is increased without improving the performance of the fan by connecting the multi-stage evaporation chambers in parallel for operation. When the ambient temperature is suitable with a small fluctuation range, and low control precision is required, the parallel-connected air mode may be used. In this case, the moisture-carrying air can be taken directly from the outside atmosphere without adding the condensing dehumidifying equipment. When the fluctuation range of the ambient temperature is large, or high control precision is required, the serial-connected air mode should be used. In this case, the moisture-carrying air is in a closed circulation, which is independent of the external environment, thereby facilitating the control on the system.

The reference signs are shown as follows:
liquid storage tanks: 11, 21, 31;
circulating liquid tanks: 19, 27, 37;
feeding pumps: 171, 221, 321;
circulation pumps: 172, 222, 322;
primary evaporation structures: 13, 23, 33;
secondary evaporation structures: 14, 24, 34;
tertiary evaporation structures: 15, 25, 35;
fans: 161, 162, 163, 261, 262, 263, 361, 362, 363;
dust collectors: 333, 343, 353;
valves: 181, 182, 183, 184, 185, 186;
condensing regenerators: 132, 142, 152, 232, 242, 252, 332, 342, 352;
condensing dehumidifiers: 133, 143, 153, 233, 243, 253;
preheaters: 12, 234, 244, 254, 334, 344, 354;
solution inlet pipes: 1311, 1411, 1511, 2311, 2411, 2511, 3311, 3411, 3511;
solution outlet pipes: 1312, 1412, 1512, 2312, 2412, 2512, 3312, 3412, 3512;
air inlet pipes: 1313, 1413, 1513, 2313, 2413, 2513, 3313, 3413, 3513; and
air outlet pipes: 1314, 1414, 1514, 2314, 2414, 2514, 3314, 3414, 3514.

DETAILED DESCRIPTION OF THE EMBODIMENTS

The present invention is further described hereinafter with reference to the drawings.

Embodiment 1

Figure 1:
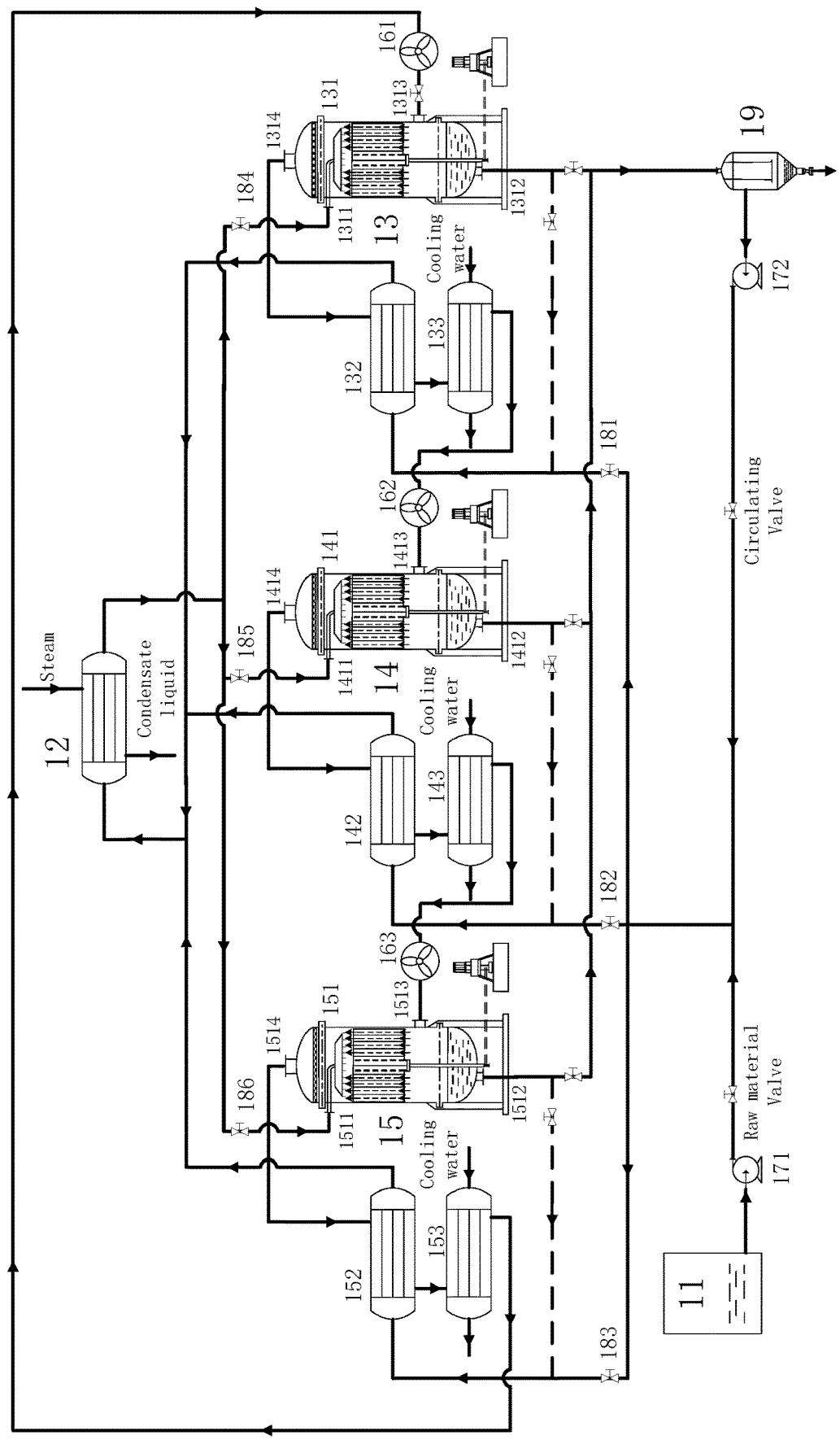
FIG. 1 is an operating schematic diagram of Embodiment 1 (the serial-connected air and the parallel-connected solution) of the present invention.

As shown in FIG. 1, the multi-stage evaporation system enhanced by a gravity-reduced field with the serial-connected air and the parallel-connected solution includes a liquid storage tank 11, a preheater 12, a primary evaporation structure 13, a secondary evaporation structure 14, a tertiary evaporation structure 15, fans 161, 162, 163, a feeding pump 171, a circulation pump 172, and a circulating liquid tank 19. The primary evaporation structure 13, the secondary evaporation structure 14, and the tertiary evaporation structure 15 respectively include an evaporation chamber 131, 141, 151, a condensing regenerator 132, 142, 152, and a condensing dehumidifier 133, 143, 153.

Solution inlet pipes 1311, 1411, 1511 are provided on upper portions of the evaporation chambers 131, 141, 151. The solution inlet pipes 1311, 1411, 1511 are connected to the preheater 12 for an inflow of the mixed liquid. Solution outlet pipes 1312, 1412, 1512 are provided on the bottom portions of the evaporation chambers 131, 141, 151. The solution outlet pipes 1312, 1412, 1512 are connected to the circulating liquid tank 19 for an outflow of the concentrated solution. Air inlet pipes 1313, 1413, 1513 are provided on the lower portions of the evaporation chambers 131, 141, 151. The air inlet pipes 1313, 1413, 1513 are connected to the fans 161, 162, 163 for an inflow of the circulating air. Air outlet pipes 1314, 1414, 1514 are provided on the top portions of the evaporation chambers 131, 141, 151. The air outlet pipes 1314, 1414, 1514 are connected to the condensing regenerators 132, 142, 152 for an outflow of the circulating air, to recover the wasted heat of the circulating air. The evaporation chambers 131, 141, 151 have a spraying structure. A plurality of spraying nozzles are arranged at the roof of the evaporation chambers. The solution sprayed from each spraying nozzle falls conically and angularly. The solution inlet pipes 1311, 1411, 1511 extend into the evaporation chambers 131, 141, 151, and then form a circular support on the roof of the evaporation chambers 131, 141, 151. The spraying nozzles are uniformly distributed on the circular supports, which facilitates the uniform spray of the liquid droplets. A cylindrical filling material is provided under the spraying nozzles, and fixed on the rotating shaft. The motor drives the rotating shaft by the belt, so that the filling material rotates at a low speed to form a gravity-reduced field. The heated solution sprayed on the filling material is subjected to a weak centrifugal force to form a movement tendency of diffusing from the middle to the periphery, so the heated solution is uniformly distributed in the filling material. The air enters the filling material from the bottom to the top and contacts the solution in a countercurrent manner to transfer the heat and mass. This structure has low requirements for the strength, rigidity, and dynamic sealing of the rotating shaft, which is easy to realize. The rotating shaft is fixed to the cylindrical filling material frame, and extends out from the bottom of the evaporation chambers 131, 141, 151. The contact portion of the rotating shaft and the bottom portions of the evaporation chambers 131, 141, 151 uses the dynamic sealing.

The liquid storage tank 11 is connected to the circulating liquid tank 19, and connected to the condensing regenerators 132, 142, 152. The condensing regenerators 132, 142, 152 of the different stages are respectively connected to the evaporation chambers 131, 141, 151 through the preheater 12. The evaporation chambers 131, 141, 151 of the different stages are connected to the circulating liquid tank 19. The pipe fans 161, 162, 163 are sequentially connected to the circulating air inlet pipes 1313, 1413, 1513 of the evaporation chambers 131, 141, 151. The circulating air outlet pipes 1314, 1414, 1514 are connected to the condensing regenerators 132, 142, 152 of the different stages and the condensing dehumidifiers 133, 143, 153 of the different stages.

The process of the system includes: the solution in the liquid storage tank 11 and the circulating liquid tank 19 are mixed and pumped into the condensing regenerators 132, 142, 152 by the feeding pump 171 and the circulation pump 172 to exchange heat with the circulating air. After entering the preheater 12 to exchange heat with the steam, the mixed solution respectively enters the evaporation chambers 131, 141, 151, and directly contacts the circulating air to transfer heat and mass. After being concentrated, the mixed liquid (i.e. the concentrated solution) enters the circulating liquid tank 19, and directly reaches the bottom of the circulating liquid tank 19 by the pipe in the middle of the circulating liquid tank 19. The solution outlet is provided at the upper portion of the side surface of the circulating liquid tank 19, so as to ensure that the solid crystals and the precipitates stay at the bottom of the circulating liquid tank 19. The solution used for circulation is the supernatant solution. A part of the supernatant solution is mixed with the raw material solution for recirculation. A part of the solution at the bottom of circulating liquid tank 19 is discharged and subjected to a crystallization process and solid-liquid separation. The circulating air is introduced into the evaporation chamber 131 by the pipe fan 161 to directly contact the heated solution to be heated up and absorb the moisture. After the condensing and heat exchange in the condensing regenerator 132, the circulating air is preliminarily cooled, and the condensing water is discharged. Then, the circulating air enters the condensing dehumidifier 133 to exchange heat with the cooling water. After further cooling, the circulating air regains a moisture absorption capacity, and is pumped into the secondary evaporation structure 14 and the tertiary evaporation structure 15 again. The mechanism of moisture absorption and dehumidification is the same as the primary evaporation structure 13. The air continuously circulates in the primary evaporation structure, the secondary evaporation structure and the tertiary evaporation structure. The opening degree of the material valve and the circulating valve is controlled through the liquid height in the circulating liquid tank 19, to control the flow rates of the solution from the liquid storage tank 11 and the circulating liquid tank 19, respectively. Moreover, the flow rates of the solution entering the condensing regenerators 132, 142, 152 of the different stages are controlled to be equal by the valves 181, 182, 183, so as to make the operation conditions of condensation and heat transfer equal in the evaporation structures of the different stages. When the mixed liquid flows through the preheater 12, the mixed liquid is equally divided into three groups by controlling the valves 184, 185, 186, and the three groups of mixed liquid enter the evaporation chambers 131, 141, 151 of the evaporation structures of the different stages.

Further, the steam is used as a heat source. The mixed liquid is heated to a predetermined temperature. The air is selected as the moisture absorbing carrier. The circulating air enters the evaporation chambers 131, 141, 151 under the action of the fans 161, 162, 163. The mixed liquid directly contacts the air to transfer heat and mass in the evaporation chambers 131, 141, 151, so that the air temperature rises, and a part of the pure water in the mixed liquid is vaporized. The air carries this part of the steam, and enters the condensing regenerators 132, 142, 152 to exchange heat with the solution. The preliminary condensation is performed to recover the waste heat of the air, and meanwhile a part of the steam in the air is condensed and precipitated. Then, after the preliminary cooling, the circulating air is reintroduced into the condensing dehumidifiers 133, 143, 153 to exchange heat with the circulating cooling water, so as to return to the state before entering the evaporation chambers 131, 141, 151. Further, the circulating air is introduced into the next-stage evaporation chamber to perform a circular moisture carry and dehumidification. A multi-stage evaporation structure in series connection is used to achieve the purpose of saving the air consumption and reducing the energy consumption of the fan.

When the system is operating, the circulating air circularly flows in the pipes, the evaporation chambers 131, 141, 151, the condensing regenerators 132, 142, 152, and the condensing dehumidifiers 133, 143, 153 under the action of the fans 161, 162, 163. After flowing through the condensing regenerators and preheaters of the different stages, the solution reaches a predetermined temperature. The solution can reach the roofs of the evaporation chambers 131, 141, 151 through the solution inlet pipes 1311, 1411, 1511, and enters the branch pipes through the liquid distributor arranged on the roofs. A plurality of spraying nozzles are uniformly distributed on the branch pipes. The solution is sprayed by the spraying nozzles and falls down conically. The solution is uniformly distributed in the filling material under the weak centrifugal force action of the gravity-reduced field. Under the action of the fans 161, 162, 163, the air is blown into the evaporation chambers 131, 141, 151 from the air inlet pipes 1313, 1413, 1513 at the bottom of the evaporation chambers. The air directly contacts the solution in a countercurrent manner to transfer the heat and mass. The concentrated liquid flows from the solution outlet pipes 1312, 1412, and 1512 at the bottom of the evaporation chambers to the circulating liquid tank 19. The moisture-carrying air is introduced from the air outlet pipes 1314, 1414, 1514 at the roofs of the evaporation chambers 131, 141, 151 to the condensing regenerators 132, 142, 152 to exchange heat with the solution, to recover the wasted heat, and reduce the consumption of heated steam.

The driving heat source can be provided by low-grade heat energy in the industrial manufacturing process, so the evaporation system of the present invention can be combined with other industrial processes in production, thereby recovering the industrial wasted heat and reducing the energy consumption. After the solution is heated by the condensing regenerators 132, 142, 152 and the preheater 12, the temperature meets the processing conditions.

In practice, the evaporation process includes two stages: a start-up stage and a stable operation stage. In the start-up stage, the feed liquid is merely the mother liquid. After the mother liquid enters the system, the concentration of the solution subjected to the first evaporation has not yet met the processing requirement. At this time, the feeding of mother liquid is stopped. The solution is compulsively circulated in the system, and subjected to multiple evaporations until reaching the processing concentration. In the stable operation stage, a part of the solution reaching the processing concentration is discharged out of the system to be subjected to a crystallization process of the next stage, and the remaining part of solution is mixed with the mother liquid in a certain proportion, so that the concentration of the mixed solution is subjected to a one time evaporation so it can reach the processing requirement, thereby achieving the purpose of continuous evaporations. More specifically, in the start-up stage, the mother liquid is evaporated and concentrated in the evaporation structures 13, 14, 15, respectively. When the raw material valve is turned off, the mother liquid is no longer fed. Further, the concentrated liquid is compulsively circulated and evaporated inside the evaporation structures until the processing requirement is satisfied, and then the concentrated liquid is fed into the circulating liquid tank 19. In the stable operation stage, the flow rate of the mother liquid from the liquid storage tank 11 and the flow rate of the concentrated liquid from the circulating liquid tank 19 are respectively controlled by the raw material valve and the circulation valve according to a proportion, and the continuous stable evaporations are proceeded.

In the present embodiment, the parallel-connected solution mode is suitable for the case where there is a large amount of solution to be processed. The multi-stage evaporation chambers are operated in parallel, thereby increasing the solution processing amount and improving the processing efficiency without the need to improve the performance of the fan. The serial-connected air mode is suitable for the case where the fluctuation range of the ambient temperature is large or high control precision is required. In this case, the moisture-carrying air is circulated in a closed cycle, and not influenced by the external environment. Under the stable operation conditions, the air in the system is circulated. After the air absorbing moisture from the evaporation chamber is cooled and dehumidified by the condensing regenerator and the condensing dehumidifier. The air regains the moisture-carrying capacity. Then, the air reenters the evaporation chamber to absorb the moisture. Such system operates stably and is easy to control.

Embodiment 2

Figure 2:
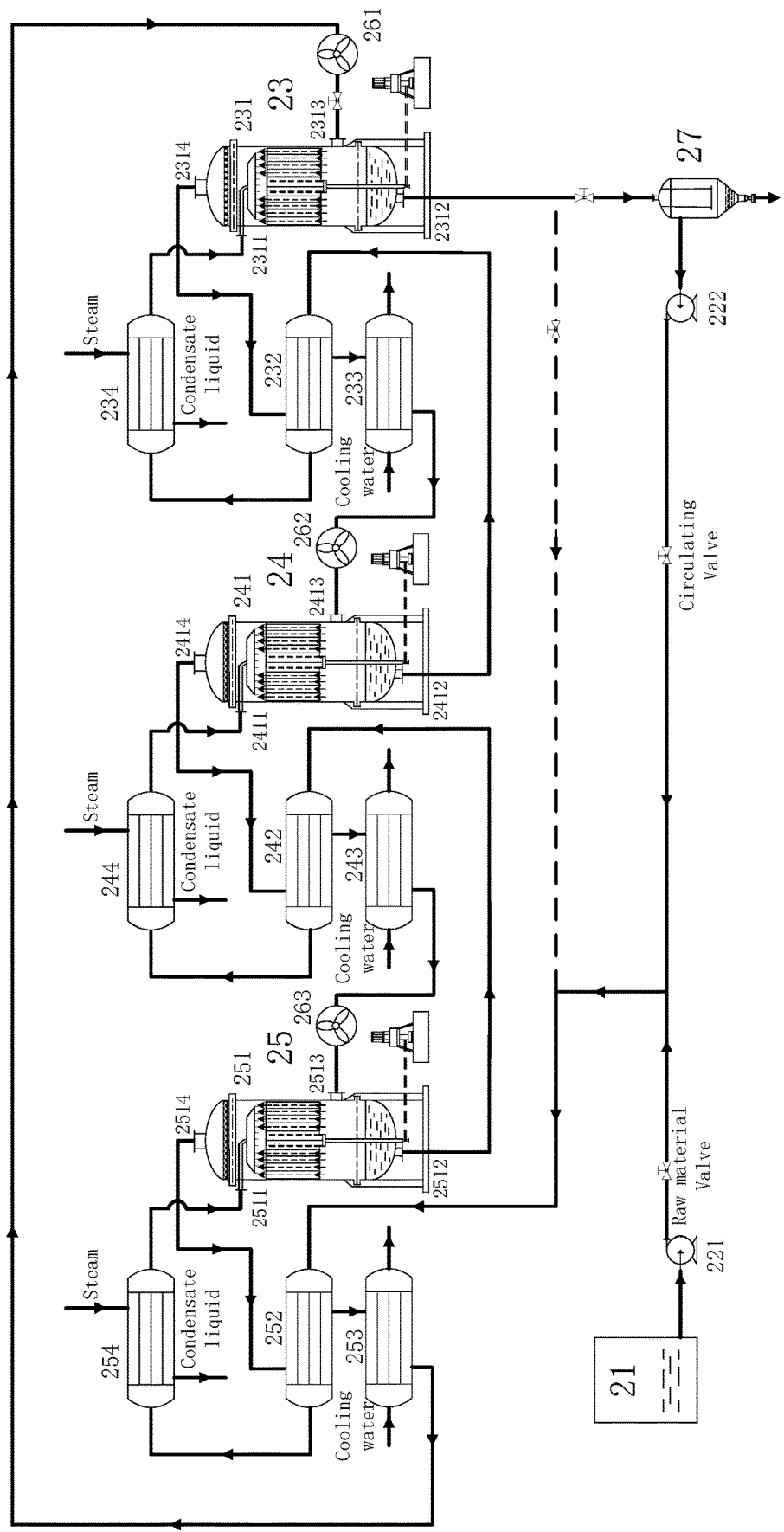
FIG. 2 is an operating schematic diagram of Embodiment 2 (the serial-connected air and serial-connected solution) of the present invention.

As shown in FIG. 2, a multi-stage evaporation system enhanced by a gravity-reduced field with the serial-connected air and serial-connected solution. The structure and principle for air circulation are the same as that of Embodiment 1, i.e. both of them are closed structures. Further, the structural functions of the components in Embodiment 2 are the same as that of Embodiment 1. Therefore, the structural functions will not be repeated here again. Embodiment 2 is different from embodiment 1 in the connection mode and the working principle, which will be described hereinafter.

The system includes a liquid storage tank 21, a feeding pump 221, a circulation pump 222, a primary evaporation structure 23, a secondary evaporation structure 24, a tertiary evaporation structure 25, fans 261, 262, 263, and a circulating liquid tank 27. The primary evaporation structure 23, the secondary evaporation structure 24, and the tertiary evaporation structure 25 respectively include an evaporation chamber 231, 241, 251, a condensing regenerator 232, 242, 252, a condensing dehumidifier 233, 243, 253, and a preheater 234, 244, 254. The raw material solution in the liquid storage tank 21 and the concentrated solution in the circulating liquid tank 27 are mixed under the action of the feeding pump 221 and the circulation pump 222, respectively. The mixed liquid sequentially enters the tertiary evaporation structure 25, the secondary evaporation structure 24, and the primary evaporation structure 23. After respectively heated by the condensing regenerators 252, 242, 232 and the preheaters 254, 244, 234 in the evaporation structures of different stages, the mixed liquid enters the evaporation chambers 251, 241, 231. In the evaporation chambers 251, 241, 231, the mixed liquid directly contacts the circulating air to transfer the heat and the mass and flows into the circulating liquid tank 27 through the bottom of the evaporation chambers 251, 241, 231. The circulating air sequentially passes through the primary evaporation structure 23, the secondary evaporation structure 24, and the tertiary evaporation structure 25 under the action of the fans 261, 262, 263 to continuously circulate.

Concerning the evaporation system using the serial-connected solution mode, in the start-up stage, the mother liquid is evaporated and concentrated by the evaporation structure 25, and then fed into the evaporation structures 24 and 23 in sequence. After being subjected to the evaporations and concentrations of the multiple stages, the mother liquid has not yet reached the concentration of the proportion. At this time, the raw material valve is turned off, and the mother liquid is no longer fed. The concentrated liquid is refed into the evaporation structure 25 to be subjected to a compulsive circulation and evaporation. After multiple circulations, the concentration of the solution increases continuously until reaching the requirement. After that, the solution is fed into the circulating liquid tank 27. In the stable operation stage, the flow rate of the mother liquid from the liquid storage tank 21 and the flow rate of the concentrated liquid from the circulating liquid tank 27 are respectively controlled by the raw material valve and the circulation valve according to a proportion. Then, a continuous stable evaporation operation proceeds.

Compared with Embodiment 1, Embodiment 2 is different from Embodiment 1 in that the serial-connected solution mode is used, which is suitable for the case where the initial concentration of the solution to be processed is low and the concentration requirement of the processing is strict. In order to meet the specific processing requirements, multiple circulation operations are required. Through the operations of the multi-stage serial-connected evaporation chambers, the solution is gradually concentrated to the specific processing requirements.

Figure 4:
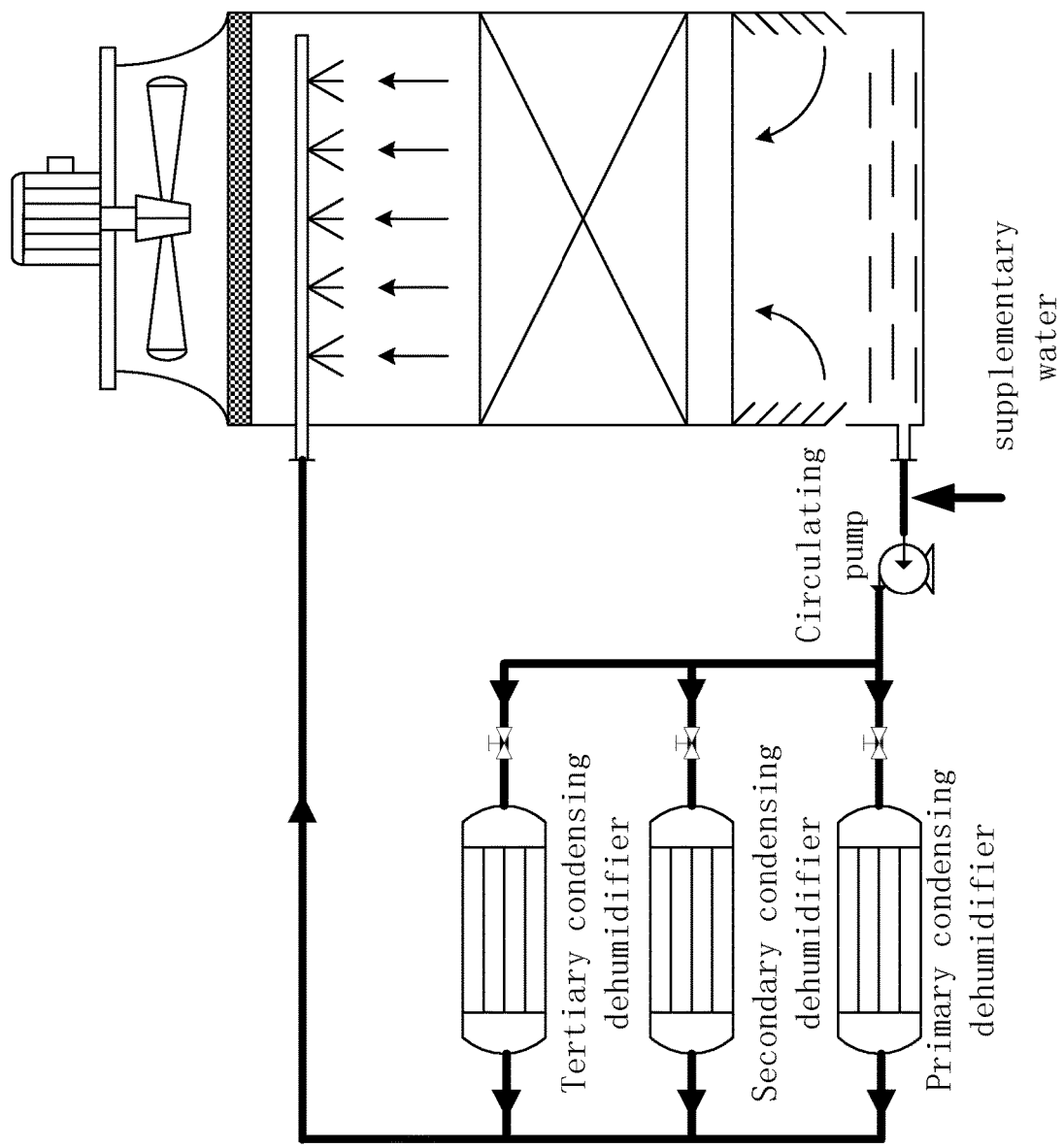
FIG. 4 is an operating schematic diagram of the circulating cooling system in Embodiment 1 and Embodiment 2 of the present invention.

The circulating cooling system shown in FIG. 4 is applicable to Embodiment 1 and Embodiment 2. The circulating cooling water is used as a cooling medium in the condensing dehumidifier. The circulating water pump is used to circulate the cooling water. After absorbing heat, the circulating cooling water is pumped into the cooling tower to be cooled. The hot water is sprayed downwards in the form of droplet or water film from the roof of the cooling tower. The cooling tower is an induced draft cooling tower. Under the action of the fan, the air flows from bottom to top, so as to form a countercurrent relative to the cooling water. There are temperature difference and humidity difference between the cooling water and the surrounding air. An evaporation heat transfer mode and a contact heat transfer mode are formed, wherein the heat transferred by the evaporation heat transfer mode is the latent heat transferred from the liquid phase to the gas phase by gasifying the cooling water in the cooling tower. This part of heat is the main part of the heat transfer. The heat transferred by the contact heat transfer mode is the sensible heat reflected in the increase of the air temperature caused by the direct heat exchange between the cooling water and air. This part of heat is a small part of the heat transfer.

Embodiment 3

Figure 3:
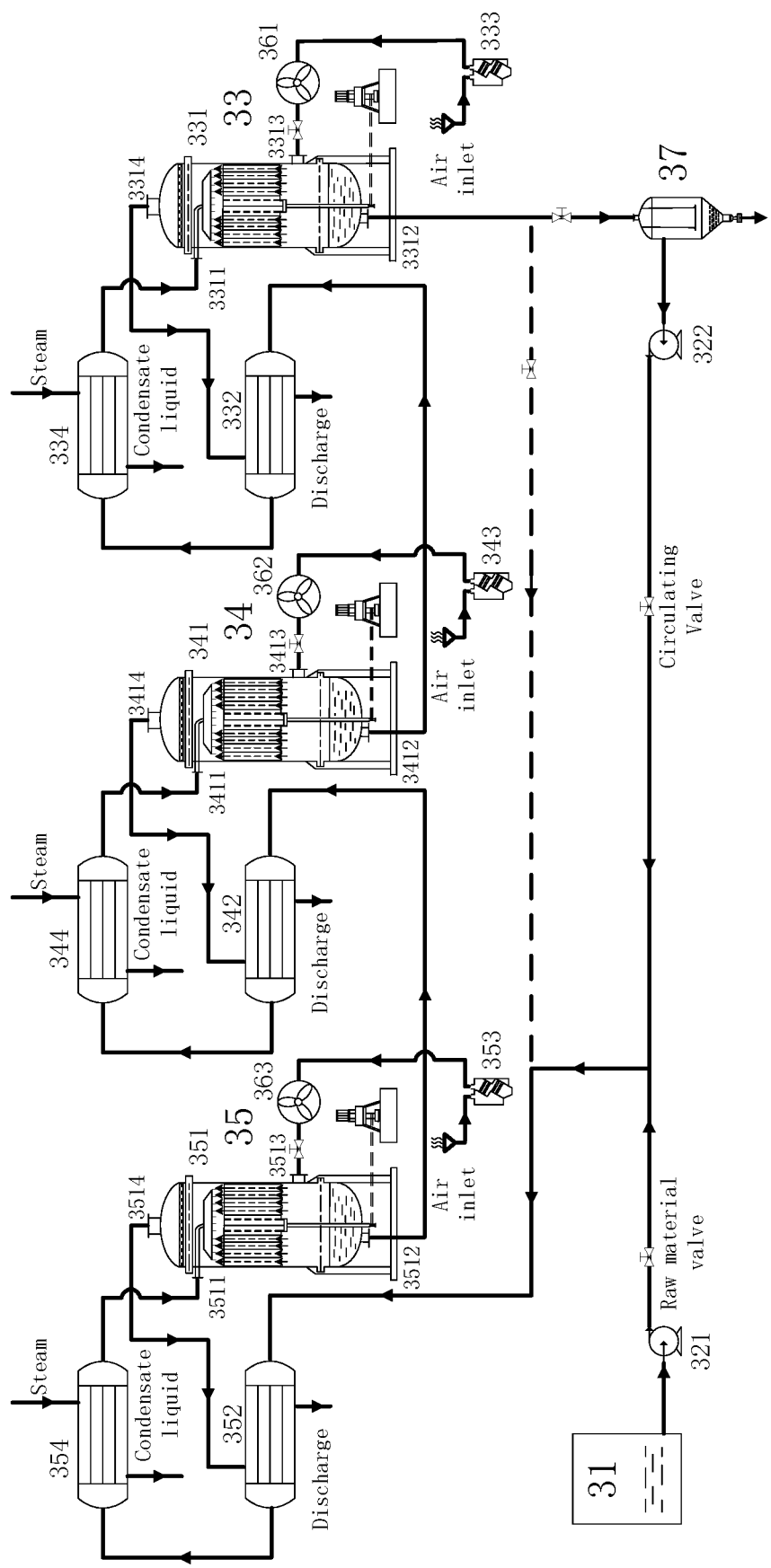
FIG. 3 is an operating schematic diagram of Embodiment 3 (the parallel-connected air and serial-connected solution) of the present invention.

As shown in FIG. 3, a multi-stage evaporation system enhanced by a gravity-reduced field with the parallel-connected air and serial-connected solution has structure and principle for solution circulation the same as that of Embodiment 2, i.e. both of them in the serial connection mode. Further, the structural functions of the components in Embodiment 3 are the same as that of Embodiment 1 and Embodiment 2. Therefore, the structural functions will not be repeated here again. Embodiment 3 is different from Embodiment 1 and Embodiment 2 in the connection mode and the working principle, which will be described hereinafter.

The system includes a liquid storage tank 31, a feeding pump 321, a circulation pump 322, a primary evaporation structure 33, a secondary evaporation structure 34, a tertiary evaporation structure 35, dust collectors 333, 343, 353, fans 361, 362, 363, and a circulation liquid tank 37. The primary evaporation structure 33, the secondary evaporation structure 34, and the tertiary evaporation structure 35 respectively include an evaporation chamber 331, 341, 351, a condensing regenerator 332, 342, 352, and a preheater 334, 344, 354. The raw material solution in the liquid storage tank 31 and the concentrated solution in the circulating liquid tank 37 are mixed by the feeding pump 321 and the circulation pump 322, respectively. The mixed liquid sequentially enters the tertiary evaporation structure 35, the secondary evaporation structure 34, and the primary evaporation structure 33. After being heated by the condensing regenerators 352, 342, 332 and the preheaters 354, 344, 334 respectively in the evaporation structures of different stages, the mixed liquid enters the evaporation chambers 351, 341, 331. In the evaporation chambers 351, 341, 331, the mixed liquid directly contacts the air to transfer the heat and mass and flows into the circulating liquid tank 37 through the bottom of the evaporation chambers 351, 341, 331. The micro-particles in the air are removed by the dust collectors 333, 343, 353, then the air respectively enters the primary evaporation structure 33, the secondary evaporation structure 34, and the tertiary evaporation structure 35 under the action of the fans 361, 363, 353 to be subjected to a moisture-carrying operation. The air inlet pipes 3313, 3413, 3513 are sequentially connected to the fans 361, 362, 363 and the dust collectors 333, 343, 353, to introduce the air. The air outlet pipes 3314, 3414, 3514 are connected to the condensing regenerators 332, 342, 352. The air is vented from the condensing regenerators 332, 342, 352.

Compared with Embodiment 2, Embodiment 3 is different from Embodiment 2 in that the parallel-connected air mode is used, which is suitable for the case where the ambient temperature is suitable, the fluctuation range of the ambient temperature is small, and low control precision is required. In this case, the moisture-carrying air can be directly taken from the ambient atmosphere without the need of adding the condensing and dehumidifying equipment.

Taking the effluent treatment as an example, the energy consumption of the system in Embodiment 1 is calculated as follows.

The treatment objective: the evaporation amount of the industrial effluent to be processed is set at 500t/d; the raw material effluent is a magnesium sulfate solution with a concentration of 20%. After evaporation, the concentration of the raw material effluent reaches 40%. Then, the concentrated raw material effluent is discharged out of the system to be subjected to a crystallization and solid-liquid separation processing.

The calculation of system energy consumption: the effluent is heated to 95° C. by the condensing regenerator and the preheater. The saturated moisture-carrying air of 35° C. enters from the bottom of the evaporation chamber, and directly contacts the effluent entering from the top of the evaporation chamber to transfer the heat and the mass. After concentrating, the temperature of the effluent is reduced to 40° C., and discharged from the bottom of the evaporation chamber. After heating and absorbing the moisture, the temperature of the air reaches 90° C., the relative humidity of the air reaches 95%, and the air is discharged from the top of the evaporation chamber. The effluent is heated to 85° C. by a condensing regenerator, and then heated to 95° C. by a preheater. The heat energy provided by the steam is 2691.79 kW. The amount of steam consumed by evaporating one ton of water is 0.21t, and the cost is 42 yuan.

The present invention is widely applicable to industries such as printing and dyeing, chemical industry, papermaking, medicine, pesticide, food, seawater desalting, fine chemical industry, etc., which can realize the evaporation operation under different temperature requirements.

The preferred embodiments of the present invention are described above. The protection scope of the present invention is not limited to the above-mentioned embodiments. All the technical solutions related to the inventive concept of the present invention fall within the protection scope of the present invention. It is should be noted that any improvements and modifications of the present invention derived by those of ordinary skill in the art without departing from the principles of the present invention are considered to be covered by the scope of the present invention.

What is claimed is:

1. A multi-stage evaporation system enhanced by a gravity-reduced field, comprising:
a liquid storage tank,
a preheater,
a primary evaporation structure,
a secondary evaporation structure,
a tertiary evaporation structure,
fans,
a feeding pump,
a circulation pump, and
a circulating liquid tank;
wherein the primary evaporation structure, the secondary evaporation structure, and the tertiary evaporation structure each comprise an evaporation chamber, a condensing regenerator, and a condensing dehumidifier, respectively;
a raw material solution in the liquid storage tank and a concentrated solution in the circulating liquid tank are mixed under an action of the feeding pump and the circulation pump, respectively, to form a mixed liquid;
the mixed liquid is equally divided into three streams, and the three streams of the mixed liquid, respectively, enter the condensing regenerator of the primary evaporation structure, the secondary evaporation structure, and the tertiary evaporation structure, respectively, for absorbing waste heat from circulating air;
after absorbing waste heat from the circulating air, the three streams of the mixed liquid are remixed and flow together to enter the preheater to be heated by steam;
after being heated by steam, the remixed liquid is equally divided into three preheated streams of the remixed liquid, and the three preheated streams of the remixed liquid, respectively, enter the evaporation chamber of the primary evaporation structure, the secondary evaporation structure, and the tertiary evaporation structure, respectively;
the remixed liquid directly contacts the circulating air in the evaporation chamber to transfer heat and mass to produce the concentrated solution, the concentrated solution flowing into the circulating liquid tank from the bottoms of the respective evaporation chambers;
the circulating air sequentially passes through the primary evaporation structure, the secondary evaporation structure, and the tertiary evaporation structure under an action of the fans to circulate, continuously; and
the evaporation chambers have a gravity-reduced field rotating structure.

2. The multi-stage evaporation system enhanced by a gravity-reduced field according to claim 1, wherein flow rates of the mixed liquid streams, entering the respective condensing regenerators of the primary evaporation structure, the secondary evaporation structure, and the tertiary evaporation structure are controlled to be equal by valves; and
after the remixed liquid flows through the preheater, the mixed liquid is equally divided into the three preheated streams of the remixed liquid to enter the respective evaporating chambers of the primary evaporation structure, the secondary evaporation structure, and the tertiary evaporation structure by controlling the valves.

3. The multi-stage evaporation system enhanced by a gravity-reduced field according to claim 1, wherein the fans blow the circulating air into the evaporation chambers from the bottoms of the evaporation chambers;
the circulating air is heated by the remixed liquid and takes away moisture in the remixed liquid, and exchanges heat with the remixed liquid in the condensing regenerators to recycle waste heat from the circulating air;
the circulating air then passes through the condensing dehumidifiers to exchange heat with cooling water, so as to make the circulating air return in a dehumidified state before entering the evaporation chambers; and
the circulating air enters an evaporation structure of a next stage to circulate.

4. The multi-stage evaporation system enhanced by a gravity-reduced field according to claim 3, wherein the condensing dehumidifiers cool the circulating air by circulating cooling water;
- after absorbing heat from the circulating air, the circulating cooling water is cooled by a cool water tower; and
- the circulating cooling water is pumped into the condensing dehumidifiers again by the circulation pump to perform a circulating operation.

5. The multi-stage evaporation system enhanced by a gravity-reduced field according to claim 1, wherein solution inlet pipes are provided on an upper portion of the evaporation chambers;
- the solution inlet pipes are connected to the preheaters for an inflow of the remixed liquid into the respective evaporation chambers;
- solution outlet pipes are provided on a respective bottom portion of each evaporation chamber;
- the solution outlet pipes are connected to the circulating liquid tank for an outflow of the concentrated solution;
- air inlet pipes are provided on a lower portion of the evaporation chambers;
- the air inlet pipes are connected to the fans for an inflow of the circulating air;
- air outlet pipes are provided on a top portion of the evaporation chambers; and
- the air outlet pipes are connected to the condensing regenerators for an outflow of the circulating air and to recycle waste heat from the circulating air.

6. The multi-stage evaporation system enhanced by a gravity-reduced field according to claim 5, wherein the evaporation chambers each have a respective spraying structure;
- a plurality of spraying nozzles are provided at a respective roof of each evaporation chambers;
- the mixed liquid sprayed by each spraying nozzle falls conically and angularly;
- each of the solution inlet pipes extends into each of the evaporation chambers to form a circular support in proximity to the roof of the evaporation chambers; and
- the spraying nozzles are uniformly arranged on the circular support.

7. The multi-stage evaporation system enhanced by a gravity-reduced field according to claim 6, wherein a cylindrical filling material layer is fixed on a rotating shaft;
- a flow of the remixed liquid that has been heated in the preheater is sprayed onto the cylindrical filling material layer through the spraying nozzles proximate to the respective roof of each evaporation chambers;
- a motor drives the rotating shaft to rotate by a belt;
- the cylindrical filling material layer is driven by the rotating shaft to rotate, so as to form the gravity-reduced field;
- the remixed liquid is uniformly distributed in the cylindrical filling material layer, and tends to move along a radial direction from a middle to a periphery of the cylindrical filling material layer.

* * * * *